United States Patent

[11] 3,622,453

| [72] | Inventors | Katsumi Akeyama;<br>Katsuya Nasu, both of Hofu-shi, Japan |
|---|---|---|
| [21] | Appl. No. | 758,592 |
| [22] | Filed | Sept. 9, 1968 |
| [45] | Patented | Nov. 23, 1971 |
| [73] | Assignee | Kyowa Hakko Kogyo Co., Ltd.<br>Tokyo, Japan |
| [32] | Priority | Sept. 12, 1967 |
| [33] | | Japan |
| [31] | | 42/58132 |

[54] PROCESS FOR PRODUCING L-THREONINE
17 Claims, No Drawings

[52] U.S. Cl...................................................... 195/29,
  195/28
[51] Int. Cl........................................................ C12d 13/06

[50] Field of Search............................................ 195/28, 29,
  47

[56] References Cited
UNITED STATES PATENTS
3,080,297  5/1963  Phillips et al. ................  195/47
2,937,122  5/1960  Huang..........................  195/47

*Primary Examiner*—A. Louis Monacell
*Assistant Examiner*—Max D. Hensley
*Attorney*—Craig, Antonelli, Stewart & Hill ABSTRACT: A process for producing L-threonine by fermentation which comprises culturing a micro-organism capable of producing L-threonine under aerobic aqueous in an equeous nutrient medium containing an antibiotic, for example, streptomycin. The addition of the antibiotic makes it possible to accumulate large yields of L-threonine in the culture liquor and prevents the conversion and disappearance thereof.

PROCESS FOR PRODUCING L-THREONINE

This invention relates to a process for producing L-threonine. More particularly, it relates to a process for the production of L-threonine by fermentation. Even more particularly, the invention relates to a process for directly producing L-threonine by fermentation by adding antibiotics to the culture medium and using mutant strains having an L-threonine-forming ability.

L-threonine is an essential amino acid in the nutrition of man and animals. The production of L-threonine has been reported in the prior art literature and patents. However, most of these processes are synthetic methods for making threonine of the D-type, which requires separation from threonine of the L-type, or processes for separating the desired product from natural materials. These methods have many disadvantages, especially from the point of view of economics. Insofar as a fermentation process is concerned, a process using homoserine as a main starting material [U.S. Pat. No. 3,099,604; Amino Acid and Nucleic Acid, Vol. 10, p. 68 (1964)] and a process employing a nutrient-requiring mutant of Escherichia coli (U.S. Pat. No. 2,937,121 and 2,937,122) have been reported. In the former case, homoserine, the starting material, is expensive, and, in the latter case, the amount of L-threonine formed and accumulated in the culture medium is small. Thus, an industrial-scale process for the production of L-threonine has not as yet been developed.

One of the objects of the present invention is to provide an improved process for the production of L-threonine which overcomes the disadvantages and deficiencies of the prior art methods.

Another object of the present invention is to provide a process for producing L-threonine by fermentation which may be carried out in an efficacious and simple manner.

A further object of the invention is to provide a process for producing L-threonine by fermentation which may be carried out advantageously on an industrial scale at low cost to give a high yield of product.

A still further object of the invention is to provide L-threonine.

These and other objects and advantages of the present invention will become apparent to those skilled in the art from a consideration of the following specification and claims.

With a view toward developing a direct fermentation process, employing an inexpensive raw material and a nutrient-requiring mutant of Escherichia coli, the present inventors have studied in detail culturing processes using L-threonine-producing mutants, particularly with respect to the optimum conditions for forming L-threonine. As a result, it has been observed that the amount of L-threonine accumulated reaches a maximum in a definite culturing time and that the amount of formed L-threonine is reduced by continuing further culturing. This is because the L-threonine-forming mutant strain employed attains an activity of converting and thereby reducing the amount of L-threonine present with the lapse of culturing time. It is clear that this phenomenon does not depend only on a lowering of L-threonine-forming activity. These conclusions can be seen from a consideration of the data in table 1.

TABLE 1

| Strain | Medium used | Lapse of culturing time (hours) | | | | |
|---|---|---|---|---|---|---|
| | | 24 | 48 | 72 | 96 | 120 |
| Escherichia coli KY-8284 ATCC 21272. | A | 1.3 | 3.2 | 5.1 | 3.8 | Trace |
| Escherichia coli KY-8280 ATCC 21148. | B | 1.8 | 3.8 | 5.8 | 4.2 | 1.0 |
| Escherichia coli KY-8281 ATTC 21149. | Basic medium. | 1.4 | 3.6 | 4.7 | 3.0 | Trace |

Note 1:
The numerical values in the table are the amounts of L-threonine formed in g./l.

Note 2:
Composition of the media:
Basic medium:
 75 g./l. of fructose
 14 g./l. of $(NH_4)_2SO_4$
 2 g./l. of $KH_2PO_4$
 1 g./l. of $MgSO_4·7H_2O$
 20 g./l. of $CaCO_3$
 100 mg./l. of diaminopimelic acid
 100 mg./l. of L-lysine hydrochloride.
A: Into the basic medium were added 100 mg./l. of methionine and 200 mg./l. of isoleucine.
B: Into the basic medium was added 100 mg./l. of methionine.

From the above results, the present inventors have concluded that the establishment of a process for selectively preventing the appearance or operation of the mechanism of conversion with the disappearance of L-threonine by the L-threonine-forming mutant itself is necessary for producing L-threonine advantageously by fermentation. As a result, and in accordance with the present invention, the present inventors have succeeded in continuing the formation of L-threonine for a long period of time without losing L-threonine in the culture liquor by adding suitable antibiotics into the culture medium before the L-threonine in the culture liquor is converted and disappears.

Antibiotics suitably employed in the present invention include, for example, streptomycin, dihydrostreptomycin, chloramphenicol, tetracycline, oxytetracycline, chlorotetracycline, kanamycin, polymyxin B and viomycin. However, this listing is merely exemplary and other antibiotics provide the effects noted in the present invention. Thus, in practice, these salts or derivatives thereof can be used so long as they attain the objects of the present invention. Mixtures of suitable antibiotics may also be employed.

The antibiotics may be added to the culture medium at any time before the L-threonine in the culture liquor is converted and disappears. If too great an amount of antibiotic is added during the propagation of the micro-organism at an early stage of culturing, the propagation of the micro-organism in an amount necessary for the formation of L-threonine is obstructed in some cases. Therefore, the most desirable effect is attained by adding the antibiotic to the medium after the propagation of the micro-organism has reached an equilibrium period during the time of culturing. Of course, the exact time of addition varies somewhat according to the type of micro-organism employed, the composition of the culture medium and the particular culturing conditions. Generally, it has been found as a result of tests comparing time with numerical values of product that the antibiotic should be added to the medium at about 8–72 hours after the initiation of culturing. Furthermore, it has been observed that the amount of antibiotic to be added varies considerably according to the particular type of antibiotic used. Hence, it is desirable that the optimum suitable amount be chosen with regard to the type of antibiotic and with relation to the time when the antibiotic is added to the medium. In the case of streptomycin, which is considered to be the most suitable antibiotic additive in the present invention, the range of effective concentration is generally about 10–300 mg. per liter of the medium. As a whole, it can be said that about 10–1,000 mg. of antibiotic per liter of the medium should be used. No particular difference has been observed between adding the entire amount of antibiotic all at one time or adding the antibiotic to the medium intermittently over a suitable period of time.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch hydrolysate, molasses, sorbitol, mannitol, glycerol, etc., or any other suitable carbon source, such as organic acids, for example, acetic acid, lactic acid, etc. These substances may be used either singly or in mixtures of two or more. As a nitrogen source, various kinds of inorganic or organic salts or compounds, such as urea, liquid ammonia or ammonium salts, such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc. In the case of using strains having particular nutritional requirements, substances which satisfy these requirements should be added to the culture medium. These include, in addition to the above materials, substances such as amino acids, for example, diaminopimelic acid, methionine, isoleucine, lysine, and the like, vitamins, biotin, complex nutrients, such as amino acids as animal and plant protein hydrolysates, nucleic acid-related materials, etc.

Culturing is carried out under aerobic conditions, such as aerobic shaking of the culture, or with aeration and agitation of a submerged culture, at a temperature of, for example, about 20° to 40° C. and at a pH of about 5–8. These conditions are not rigid but vary somewhat, depending upon the particular micro-organism employed.

According to the process of the present invention, the amount of L-threonine accumulated in the culture liquor increases remarkably, and 10–15 g./l. of L-threonine, compared to about 3–5 g./l. as a maximum amount of accumulated L-threonine in the case when antibiotics are not added therein, can be accumulated. It can be seen that the present invention permits the production of L-threonine advantageously on a commercial scale.

After the completion of culturing, which usually takes about 2 to 6 days, the L-threonine can be recovered by conventional means, such as ion-exchange resin treatment, extraction with solvents, precipitation, adsorption, chromatography or the like.

The following examples are given merely as illustrative of the present invention and are not to be considered as limiting. Unless otherwise noted, the percentages therein and throughout the application are by weight per liter of water. The micro-organism strains advantageously employed in the present invention are described therein.

EXAMPLE 1

Forty milliliters of a medium containing 20 g./l. of glucose, 10 g./l. of peptone, 10 g./l. of yeast extract, 2.5 g./l. of NaCl and 50 mg./l. of diaminopimelic acid is placed in an Erlenmeyer flask having a capacity of 250 ml. After sterilization, *Escherichia coli* KY–8280 ATCC 21148 (a nutrient-requiring mutant which needs diaminopimelic acid and methionine as essential factors for its growth) is inoculated therein and is subjected to culturing at 30° C. for 24 hours with aerobic shaking at 220 times/minute in order to obtain a seed culture.

A fermentation medium having the following composition is prepared:

75 g./l. fructose
14 g./l. $(NH_4)_2SO_4$
2 g./l. $KH_2PO_4$
1 g./l. $MgSO_4 \cdot 7H_2O$
20 g./l. $CaCO_3$
100 mg./l. diaminopimelic acid
100 mg./l. DL-methionine
100 mg./l. L-lysine hydrochloride Forty milliliters of the fermentation medium is poured into an Erlenmeyer flask having a capacity of 250 ml. After sterilization, 4 ml. of the seed culture liquor is inoculated therein, and culturing is conducted with aerobic shaking at the rate of 220 times/minute at 30° C. for 120 hours. After 30 hours of culturing various antibiotics, as shown in table 2, are added to each of the flasks, respectively.

The amounts of L-threonine formed in the culture liquor after the completion of culturing are shown in table 2 in comparison with the situation after 72 hours of culturing and the case where no antibiotic is added to the medium.

TABLE 2

| Antibiotic | Amount of antibiotic added (mg./l.) | Amount of L-threonine formed after 72 hours (g./l.) | Amount of L-threonine formed after 120 hours (g./l.) |
|---|---|---|---|
| Streptomycin (sulfate) | 30 | 6.3 | 12.3 |
| Dihydrostreptomycin (sulfate) | 30 | 6.8 | 11.2 |
| Chloramphenicol | 50 | 5.7 | 11.3 |
| Tetracycline | 50 | 6.2 | 10.5 |
| Chlorotetracycline | 50 | 6.0 | 9.8 |
| Oxytetracycline | 50 | 5.4 | 9.6 |
| Kanamycin (sulfate) | 40 | 6.3 | 11.7 |
| Polymyxin B | 20 | 6.0 | 11.0 |
| Viomycin (sulfate) | 30 | 5.6 | 10.3 |
| No addition | | 5.8 | 1.2 |

EXAMPLE 2

Culturing is effected in the same manner as described in example 1, except that the mount of streptomycin (sulfate) added and the times of addition are varied. The results are shown in table 3.

TABLE 3

| Addition time (time after initiation of culturing) | Addition amount (mg./l.) | Amount of L-threonine formed after 72 hours (g./l.) | Amount of L-threonine formed after 120 hours (g./l.) |
|---|---|---|---|
| | No addition | 5.3 | 0.8 |
| 16 | 40 | 5.9 | 8.3 |
|    | 80 | 6.0 | 7.2 |
| 24 | 40 | 6.3 | 10.9 |
|    | 80 | 6.3 | 9.8 |
| 32 | 40 | 6.0 | 11.8 |
|    | 80 | 5.6 | 12.3 |
| 40 | 40 | 5.5 | 13.2 |
|    | 80 | 5.3 | 13.0 |
| 48 | 40 | 4.8 | 13.2 |
|    | 80 | 5.0 | 11.8 |
| 60 | 40 | 5.3 | 7.2 |
|    | 80 | 5.7 | 9.3 |
| 72 | 40 | 5.6 | 9.8 |
|    | 80 | 5.6 | 5.6 |

EXAMPLE 3

Culturing is conducted in the same manner as described in example 1, except that the amount of carbon source used in the fermentation medium is 75 g./l. of glucose and that 50 mg./l. of streptomycin is used as the additive antibiotic. The amount of L-threonine formed in the resultant culture liquor after the completion of culturing is 12.2 g./l.

Only 1.1 g./l. of L-threonine is observed in the liquor in the case when streptomycin is not added to the medium.

EXAMPLE 4

A seed medium is prepared in the same manner as in example 1 with the use of *Escherichia coli* KY–8284 ATCC 21272 (a nutrient-requiring mutant which needs diaminopimelic acid, methionine and isoleucine as essential factors for its growth) as the L-threonine-forming micro-organism.

The fermentation medium employed has the following composition:

| | |
|---|---|
| 50 g./l. | glycerol |
| 14 g./l. | $(NH_4)_2SO_4$ |
| 2 g./l. | $KH_2PO_4$ |
| 1 g./l. | $MgSO_4 \cdot 7H_2O$ |
| 20 g./l. | $CaCO_3$ |
| 100 mg./l. | diaminopimelic acid |
| 100 mg./l. | DL-methionine |
| 200 mg./l. | L-isoleucine |
| 100 mg./l. | L-lysine hydrochloride |

Forty milliliters of the fermentation medium is placed in an Erlenmeyer flask having a capacity of 250 ml. After sterilization, the seed culture is inoculated therein and culturing is carried out with aerobic shaking of the culture at 220 times/minute at 32° C. After 35 hours of culturing, 50 mg./l. of streptomycin (sulfate) is added to the medium and culturing is effected for another 120 hours. The amount of L-threonine accumulated in the culture liquor after the completion of culturing is 8.3 g./l.

As a comparison, culturing is conducted without adding streptomycin to the medium. The amount of L-threonine accumulated after 72 hours of culturing is 4.7 g./l. However, the L-threonine almost disappears after 120 hours.

EXAMPLE 5

A seed culture is obtained in the same manner as described in example 1 with *Escherichia coli* KY–8281 ATCC 21149 (a nutrient-requiring mutant which needs diaminopimelic acid for its growth).

An aqueous nutrient medium having the following composition is used for the fermentation:

| | |
|---|---|
| 75 g./l. | fructose |
| 14 g./l. | $(NH_4)_2SO_4$ |
| 2 g./l. | $KH_2PO_4$ |
| 1 g./l. | $MgSO_4 \cdot 7H_2O$ |
| 20 g./l. | $CaCO_3$ |
| 100 mg./l. | diaminopimelic acid |
| 100 mg./l. | L-lysine hydrochloride |

Forty milliliters of fermentation medium is placed in an Erlenmeyer flask having a capacity of 250 ml. After sterilization, the above-mentioned seed culture is inoculated into the medium. Culturing is then carried out with aerobic shaking at 220 times/minute at 30° C. After 40 hours of culturing, 80 mg./l. of streptomycin (complex) is added to the medium, and culturing is then continued for another 120 hours. The amount of L-threonine formed in the resultant culture liquor after the completion of culturing is 7.8 g./l.

As a comparison, culturing is carried out without adding the streptomycin to the medium. After 72 hours of culturing, 4.2 g./l. of L-threonine is accumulated in the liquor. However, it almost disappears after 120 hours of culturing.

While particular mutant strains of micro-organism advantageously employed in the present invention have been specifically shown in the working examples, it is to be understood that the present invention may also be carried out generally with mutants which have the ability to produce L-threonine by fermentation.

The invention being thus described, it will be obvious that the same may be varied in many ways. Such variations are not to be regarded as a departure from the spirit and scope of the invention, and all such modifications are intended to be included within the scope of the following claims.

We claim:

1. In a process for producing L-threonine by culturing a micro-organism capable of producing L-threonine and belonging to *Escherichia coli* under aerobic conditions in an aqueous nutrient medium, the improvement which comprises adding an antibiotic or a mixture of antibiotics to the medium after the growth of said micro-organism but before substantial metabolism of the produced L-threonine has begun.

2. The process of claim 1, wherein said antibiotic is selected from the group consisting of streptomycin, dihydrostreptomycin, chloramphenicol, tetracycline, oxytetracycline, chlorotetracycline, kanamycin, polymyxin B and viomycin.

3. A process for producing L-threonine which comprises culturing a micro-organism capable of producing L-threonine and belonging to *Escherichia coli* under aerobic conditions in an aqueous nutrient medium containing at least one antibiotic, said antibiotic being added to the medium after the growth of said micro-organism but before substantial metabolism of the produced L-threonine has begun, accumulating L-threonine in the resultant culture liquor, and recovering said L-threonine therefrom.

4. The process of claim 3, wherein said antibiotic is selected from the group consisting of streptomycin, dihydrostreptomycin, chloramphenicol, tetracycline, oxytetracycline, chlorotetracycline, kanamycin, polymyxin B and viomycin.

5. The process of claim 3, wherein said antibiotic is added to the medium before the produced L-threonine in the culture liquor undergoes conversion and begins to disappear.

6. The process of claim 3, wherein said antibiotic is added to the medium within the time period of 8 to 72 hours after the initiation of culturing.

7. The process of claim 3, wherein said antibiotic is streptomycin.

8. The process of claim 7, wherein the amount of streptomycin added to the medium is 10–300 mg. per liter of medium.

9. The process of claim 3, wherein the amount of antibiotic added to the medium is 10–1,000 mg. per liter of the medium.

10. The process of claim 3, wherein said antibiotic is added to the medium all at one time.

11. The process of claim 3, wherein said antibiotic is added to the medium intermittently.

12. The process of claim 3, wherein culturing is carried out at a temperature of about 20° to 40° C. and at a pH of about 5 to 8.

13. A process for producing L-threonine which comprises culturing a micro-organism selected from the group consisting of *Escherichia coli* ATCC 21148, *Escherichia coli* ATCC 21272 and *Escherichia coli* ATCC 21149 in an aqueous nutrient medium containing at least one antibiotic, said antibiotic being added to the medium after the growth of said micro-organism but before substantial metabolism of the produced L-threonine has begun, accumulating L-threonine in the resultant culture liquor, and recovering said L-threonine therefrom.

14. The process of claim 13, wherein said antibiotic is selected from the group consisting of streptomycin, dihydrostreptomycin, chloramphenicol, tetracycline, oxytetracycline, chlorotetracycline, kanamycin, polymyxin B and viomycin.

15. The process of claim 14, wherein said antibiotic is added to the medium within the time period of 8 to 72 hours after the initiation of culturing.

16. The process of claim 13, wherein culturing is carried out at a temperature of about 20° to 40° C., and at a pH of about 5 to 8.

17. The process of claim 16, wherein said antibiotic is streptomycin.

* * * * *